Patented July 7, 1942

2,289,266

UNITED STATES PATENT OFFICE 2,289,266

METHOD OF MAKING CASTING RESINS

Otto Hansen, Yonkers, N. Y., assignor to Otto Hansen, Yonkers, N. Y., and Peter Ch. Christensen, East Orange, N. J.

No Drawing. Application May 3, 1940, Serial No. 333,137

6 Claims. (Cl. 260—44)

This invention is directed to resins, more particularly to the type of resins which are produced in liquid form, cast into molds and then permanently hardened.

Resins of this type have heretofore been in common use. One of the most common resins of this type are the well known phenol formaldehyde resins, which are made by the condensation of phenol and formaldehyde in predetermined proportions, usually with an alkaline catalyst such as caustic soda or the like. Resins of this kind are subject to certain disadvantages in various respects and attempts have been made in the past to improve the same.

For instance, it has been proposed to add to a phenol formaldehyde resin in the initial stages of condensation phthalic anhydride or the like, usually in solution, in a specified amount of glycerol. It has also been proposed to add a mixture of glycerol and phthalic anhydride in the proportions necessary to form a phthalic glyceride resin to the initial phenol formaldehyde condensation product and to continue the reaction for the purpose of providing a mixed phthalic glyceride phenol formaldehyde resin. However, the combined resin so formed has certain inherent disadvantages, among which is the fact that it is substantially impossible in commercial operating conditions to obtain a clear resin. Ordinarily, resins so made form cloudy masses within the mass of the final hardened product.

In view of the above, it is among the objects of the present invention to provide a novel method of making phenol formaldehyde resins such as to avoid the disadvantages inherent in prior resins of this type.

It is also among the objects of the present invention to provide a combined phthalic glyceride phenol formaldehyde resin which may be formed easily and simply and which after hardening is clear and colorless.

It is also among the objects of the present invention to provide a final product which has improved transparency, which is tougher than those previously known, which may be greatly overcured without deterioration, and which does not have any tendency to absorb moisture from the atmosphere on long exposure.

In practicing the present invention, I first provide a phenol formaldehyde resin in the initial stage of condensation. Preferably, I condense one mol of phenol or its equivalent with 2.5 mols of formaldehyde or its equivalent, in an alkaline solution such as of caustic soda or potash. I also provide an initial condensation product of glycerine and phthalic anhydride, preferably with a substantial excess of glycerine over the amount necessary to combine with the phthalic anhydride to give a neutral phthalic glyceride resin. It is essential that the reaction between the phthalic anhydride and glycerine be carried on for more than 15 minutes and in practically all cases for over 20 minutes at a temperature of about 400–410° F. It has been found that a period of reaction of from 30 to 75 minutes gives good results. Such an initial condensation product is then added to the initial phenol formaldehyde condensation product and the liquid mixture is subjected to distillation in a vacuum at as low a temperature as feasible until substantially all of the water in the mixture is driven off. The product remains a clear, colorless liquid which may be cast and cured as is common practice.

The excess of glycerine is of considerable importance, in that although it is substantially entirely combined with the phthalic anhydride, although not forming a completely neutral combination, by reason of its presence it allows the complete distillation of water in the dehydration process without at the same time adversely affecting the non-hygroscopic character of the resin. While it is not quite certain just the exact mechanism of the reactions which take place, it is believed that the phthalic anhydride, although combined with the glycerine, is capable of combining with the caustic alkali present with the probable formation of a sodium salt of glycerophthalic acid.

The following examples will illustrate the operation of the present invention:

Example I 284 grams of 88% phenol is mixed with 608 grams of a 37% solution of formaldehyde in water. 5 grams of 95% sodium hydroxide is dissolved in 25 cc. of water and the solution added to the mixture of phenol and formaldehyde. It is heated on an open flame with a water cooled reflux condenser until the solution begins to boil. The flame is removed and boiling is continued for about 30 minutes with the application of heat from time to time when the boiling diminishes.

Separately, there is provided 280 grams of phthalic anhydride mixed with 400 grams of glycerol. This mixture is heated gradually to a temperature of 400–410° F. with an air condenser to cause condensation and return of any vapors arising in the operation. The reaction is caused to continue at the stated temperature for 45 minutes, forming a very viscous, pale amber product. It is allowed to cool.

50 grams of the initial condensation product of glycerol and phthalic anhydride are added to 325 grams of the phenol formaldehyde resin described above. The mixture is subjected to distillation in a vacuum until substantially all of the water has been driven off. The liquid is then cast into molds and the latter placed in a curing oven at an initial temperature of 60° C. The oven is maintained at a gradually increasing temperature up to a maximum of 80° C. over a period of four days.

In order to compare the product made in accordance with the present invention with a product made according to prior practice, a mixture was made of 18 grams phthalic anhydride, 12 grams of 85% lactic acid, and 25 grams of 85% glycerol. These three ingredients were thoroughly mixed until the phthalic anhydride had dissolved in the solution. This mixture was then added to 325 grams of the phenol formaldehyde resin described above and the subsequent treatment of the mixture was identical with the treatment as set forth above.

After the curing was completed, the prior art product showed large flakes of material disseminated throughout the mass of the hardened resin and it was impossible to find any portion of the hardened body which was even moderately free from such opaque flaky material. In direct contrast thereto, the product made by the present invention was entirely clear and showed no flaky or other insoluble particles whatsoever. It was also substantially colorless.

*Example II*

284 grams of 88% phenol was mixed with 608 grams of 37% aqueous formaldehyde. A solution was made of 7.65 grams of 95% potassium hydroxide in 25 cc. of water and the solution was added to the mixture of phenol and formaldehyde. It was heated on an open flame with a water cooled reflux condenser to boiling and the boiling maintained for a period of 25 minutes.

A phthalic glyceride resin was formed by reacting 280 grams of phthalic anhydride with 400 grams of glycerol at 400–410° F. for a period of 75 minutes. Thereafter, 50 grams of this resin was added to 325 grams of the phenol formaldehyde resin, water distilled off in a vacuum, the resin cast and then cured in an oven at 60–80° C. for 8 days.

After the curing, the product was as clear and as colorless as the product described in Example I. In further experimentation, it was found that when the initial phthalic glyceride resin was condensed for a period of 105 minutes and thereafter the procedure followed as described above, the product began to show a little color. Otherwise, it was equally as good in its physical properties as the other resins made in accordance with the present invention.

The products described herein have certain important advantages over the prior art. The ordinary phenol formaldehyde resin, after casting and hardening and when viewed against the light, shows considerable waviness, which is apparent by the distortion of light passing through the mass. The present product has substantially no waviness at all and there is no distortion of light passing through the same. Because there is no free glycerine or free lactic acid in the present product, it is much less hygroscopic than products heretofore made. It has been found that under equivalent conditions the present product cures in about half the time which was necessary in the curing of the prior type of phenol formaldehyde casting resin.

There is no critical point in the curing operation with the present resin and it is possible to over-cure the product greatly without any deterioration in the strength or other qualities, except that the product tends to darken on long over-curing. The product is much tougher than the ordinary phenol formaldehyde resins and is never brittle, even though it has been subjected to a long over-curing. Furthermore, a long time of exposure to varying atmospheric conditions does not decrease the toughness or tend to make the product at all brittle.

Quite frequently in prior products a phenomenon known as "spreckels" was found. This occurred usually when there was over-curing of the product in the oven and apparently consisted of tiny flecks within the casting which probably were minute fractures of the resin. These "spreckels" provided various cleavage planes and formed lines of weaknesses, so that the cast product often broke along these planes. The present product, even though it may have been over-cured by many days, still gave not the slightest indication of any "spreckels."

Although I have described my invention setting forth a single embodiment thereof, it will be apparent to those skilled in the art that the examples were intended to illustrate the invention and not to limit it. Various changes in the details of operation may be made, as for example, in providing the phthalic glyceride resin one may add modifying ingredients such as by the substitution of other acids in part for the phthalic anhydride, as for example, saturated and unsaturated higher fatty acids, benzoic, tartaric, and like acids. It is, of course, elementary that in place of the phthalic anhydride, phthalic acid, which is the equivalent thereof, may be used. It is also feasible to vary the ratios of ingredients in each of the resins which are afterwards combined to form the present product, and various methods and variations used in the processing thereof. Pigments of various types may be added to give colored, opaque and opalescent products.

In some cases it is desirable to increase the amount of phthalic glyceride resin in the composition. By such increase there is formed a plastic mass which after hardening has sufficient plasticity so that articles may be punched, turned or otherwise mechanically obtained therefrom. Ordinary finishing and polishing operations will provide a high degree of finish on the surfaces which have been mechanically worked. By the use of such a plasticizer, the disadvantages of prior plasticizers in phenol resins are eliminated. Most plasticizers are of oily nature and are insoluble in the resin, and therefore produce cloudiness therein. When glycerine is used as a plasticizer, the resulting composition tends to absorb water from the air. When the phthalic glyceride material of the present invention is introduced in excess, it plasticizes the composition without any disadvantageous effects. These and other changes may be made within the spirit of the invention, the scope of which is defined in the claims appended hereto.

What I claim is:

1. A method of making casting resins which comprises causing a reaction to take place between phenol and formaldehyde in the proportions of approximately 1 mol of phenol to 2.5 mols of formaldehyde to form an initial liquid condensation product, in the presence of an aqueous alkaline medium, separately reacting a mixture consisting of glycerol and phthalic anhydride for a period of at least twenty minutes at a temperature of 400°–410° F. to form an initial liquid condensation product, the glycerol being substantially in excess of that required for formation of a neutral product with phthalic anhydride, mixing the two products, and evaporating the resultant solution to dehydrate the same and to cause chemical combination of the constituents.

2. A method of making casting resins which comprises causing a reaction to take place between phenol and formaldehyde in the proportions of approximately 1 mol of phenol to 2.5 mols of formaldehyde to form an initial liquid condensation product, in the presence of an aqueous alkaline medium, separately reacting a mixture consisting of glycerol and phthalic anhydride for a period of at least twenty minutes at a temperature of 400°–410° F. to form an initial liquid condensation product, the glycerol being substantially in excess of that required for formation of a neutral product with phthalic anhydride, mixing the two products, and vacuum evaporating the resultant solution to dehydrate the same and to cause chemical combination of the constituents.

3. A method of making casting resins which comprises causing a reaction to take place between phenol and formaldehyde in the proportions of approximately 1 mol of phenol to 2.5 mols of formaldehyde to form an initial liquid condensation product, in the presence of an aqueous alkaline medium, separately reacting a mixture consisting of glycerol and phthalic anhydride for a period of from 20 to 105 minutes at a temperature of 400°–410° F. to form an initial liquid condensation product, the glycerol being substantially in excess of that required for formation of a neutral product with phthalic anhydride, mixing the two products, and evaporating the resultant solution to dehydrate the same and to cause chemical combination of the constituents.

4. A method of making casting resins which comprises causing a reaction to take place between phenol and formaldehyde in the proportions of approximately 1 mol of phenol to 2.5 mols of formaldehyde to form an initial liquid condensation product, in the presence of an aqueous alkaline medium, separately reacting a mixture consisting of glycerol and phthalic anhydride for a period of from 30 to 75 minutes at a temperature of 400°–410° F., to form an initial liquid condensation product, the glycerol being substantially in excess of that required for formation of a neutral product with phthalic anhydride, mixing the two products, and evaporating the resultant solution to dehydrate the same and to cause chemical combination of the constituents.

5. A method of making cast resins which comprises causing a reaction to take place between phenol and formaldehyde in the proportions of approximately 1 mol of phenol to 2.5 mols of formaldehyde to form an initial liquid condensation product, in the presence of an aqueous alkaline medium, separately reacting a mixture consisting of glycerol and phthalic anhydride for a period of at least twenty minutes at a temperature of 400°–410° F. to form an initial liquid condensation product, the glycerol being substantially in excess of that required for formation of a neutral product with phthalic anhydride, mixing the two products, and evaporating the resultant solution to dehydrate the same and to cause chemical combination of the constituents, casting the product in molds, and curing the same at elevated temperatures to permanently harden the same.

6. A method of making casting resins which comprises causing a reaction to take place between phenol and formaldehyde in the proportions of approximately 1 mol of phenol to 2.5 mols of formaldehyde to form an initial liquid condensation product, in the presence of an aqueous alkaline medium, separately reacting a mixture consisting of glycerol and phthalic anhydride for a period of at least twenty minutes at a temperature of 400°–410° F. to form an initial liquid condensation product, the glycerol being substantially in excess of that required for formation of a neutral product with phthalic anhydride, mixing the two products in such proportions that the phenol-formaldehyde resin is the major constituent, and evaporating the resultant solution to dehydrate the same and to cause chemical combination of the constituents.

OTTO HANSEN.